United States Patent [19]
Senderling et al.

[11] Patent Number: 5,849,133
[45] Date of Patent: Dec. 15, 1998

[54] LOW VOC CLEANER/PRIMER FOR EPDM AND BUTYL ROOFING AND WATERPROOFING MEMBRANES

[75] Inventors: Ronald Lynn Senderling; Laura E. Gish, both of Carlisle, Pa.

[73] Assignee: Carlisle Companies Incorporated, Syracuse, N.Y.

[21] Appl. No.: 698,462

[22] Filed: Aug. 15, 1996

Related U.S. Application Data

[63] Continuation of Ser. No. 378,124, Jan. 24, 1995, abandoned.
[51] Int. Cl.⁶ .................................................... C09J 5/04
[52] U.S. Cl. ..................... 156/315; 156/157; 156/281; 428/57; 524/491; 524/502
[58] Field of Search .................................. 524/491, 502; 428/57; 156/315, 281, 157

[56] References Cited

U.S. PATENT DOCUMENTS

| | | |
|---|---|---|
| 4,404,056 | 9/1983 | Kakehi et al. . |
| 4,588,637 | 5/1986 | Chiu . |
| 4,601,935 | 7/1986 | Metcalf et al. ............................ 428/57 |
| 4,855,172 | 8/1989 | Chiu ......................................... 428/87 |
| 5,095,068 | 3/1992 | Chiu . |
| 5,242,727 | 9/1993 | Briddell et al. . |

*Primary Examiner*—John J. Gallagher
*Attorney, Agent, or Firm*—Rader, Fishman and Grauer, PLLC

[57] ABSTRACT

A low VOC cleaner/primer for EPDM and butyl roofing and waterproofing membranes. Highly volatile solvents are replaced with a carefully chosen petroleum oil and a blend of hydrocarbon resin and partially cross-linked halo-butyl rubber. The cleaner/primer contains halo-butyl rubber, a high softening point resin tackifier, a low viscosity, high volatility petroleum oil and a curing agent. When applied to a dust covered membrane the cleaner/primer effectively displaces dust and leaves behind a primer film which is conducive to adhesive bonding by either splicing tape or solvent based adhesive. When applied in a thin coating to metal surfaces the cleaner/primer effectively primes the metal to enhance the adhesion of butyl rubber based splicing tape or solvent based butyl adhesives.

12 Claims, No Drawings ically produced by laminating unvulcanized sheets and
LOW VOC CLEANER/PRIMER FOR EPDM AND BUTYL ROOFING AND WATERPROOFING MEMBRANES This is a continuation of application Ser. No. 08/378,124, filed Jan. 24, 1995, now abandoned.

TECHNICAL FIELD

The present invention relates generally to compositions for cleaning and priming EPDM and butyl roofing and waterproofing membranes and priming metal for bonding with butyl adhesives. More specifically, the present invention relates to low VOC cleaner/primer compositions for field use in removing talc residue from such membranes and removing soil and contaminants from metal.

BACKGROURD OF THE INVENTION

As will be appreciated by those skilled in the art, membrane roofing materials are flat sheets of either single-ply or multiple-ply sheets formed of polymeric materials such as ethylene propylene diene monomer or isobutylene diene copolymer. These roofing and waterproofing membranes are typically produced by laminating unvulcanized sheets and rolling the laminated sheets onto a steel curing mandrel. In order to prevent the layers of the roll from bonding together on the mandrel as they are cured, a coating of talc is applied to the sheets. The talc typically comprises hydrous magnesium silicate powder and serves as an excellent blocking agent for the unvulcanized Rubber sheets. After the sheets are vulcanized on the mandrel, they are removed and separated. A thin residue of talc remains adhered to the sheets.

Roofing sheets are typically provided in large rolls of material of standard widths. After a section of sheeting material is applied to a roof surface, a second section is laid down next to and partially overlapping the first section. In order to create a water-tight seal between the adjacent, overlapping roofing sheets, it is necessary to create a bond at the splice or lap-joint. This is generally achieved by placing an adhesive material between the two roofing sheets at the region of overlap.

In some applications, a contact adhesive is applied to one or more of the roofing sheets at the lap-joint and is allowed to dry. Alternatively, pressure-sensitive adhesive roofing tape is used to bond the lap-joint. These tapes are designed to take the place of liquid roofing adhesives. Conventional tapes are provided as a roll having a release liner. The tape is separated from the liner material and is applied to the surface of the roofing sheet at the region where the lap-joint is formed. The tape is placed between the overlapping surfaces of the roofing sheets along the entire length of the joint.

After the liquid adhesive or roofing tape has been applied, the sheets are overlapped and pressure is applied to cause the two sheets to bond together. After the two sheets are joined in this manner, a caulking material may be used along the edge of the top layer at the joint in order to provide additional protection to the lap-joint against water.

As will be appreciated by those skilled in the art, however, the talc residue which remains on the sheets interferes with the bonding of the adhesive to the roofing sheets. This in turn decreases the bond strength of the lap-joint. Accordingly, the talc residue is removed prior to applying the adhesive to the roofing sheet typically with a solvent-based cleaner or splice wash. These cleaning solutions comprise 96–100% organic solvent blend in admixture with small amounts of colorants and/or adhesion promoters. They are high VOC compositions (700+g/l) and their use is regulated in many areas due to environmental and health concerns. For example, some government regulations restrict the VOC content of cleaners, washes and primers for roofing membrane applications to less than 250 g/l. Although some solvents such as methylene chloride and methyl chloroform have been exempted from these restrictions, in most instances this has been a temporary exemption. The VOC cleaners are utilized in the field as a scrubbing solution to wash away the talc residue prior to applying the roofing adhesive.

It would therefore be desirable to provide a roofing membrane cleaner/primer which does not contain an excessive concentration of volatile organic compounds.

It would further be desirable to provide such a composition which promotes adhesion of the roofing adhesive to the roofing sheets and contributes to the bond strength of the lap-joint.

As will be appreciated by those skilled in the art, it is often necessary to secure such single-ply roofing membranes to metal substrates such as pipes, roof units, or metal wall flashings. It is desirable to use the same material to clean and prime both the rubber membrane and the metal surface.

It would further be desirable to provide such a composition which does not contain an excessive concentration of volatile organic compounds and which does promote adhesion of the roofing adhesive to both the roofing membrane and the metal substrate, and which contributes to the bond strength of the lap-joint.

It is therefore an object of the present invention to provide a primer/cleaner composition in which the majority of the VOC content is replaced by non-VOC components.

It is a further object of the invention to provide a low VOC cleaner/primer which serves to promote adhesion between bonding surfaces.

SUMMARY OF INVENTION

In one aspect the present invention provides a cleaner/primer which contains partially cross-linked halogenated butyl rubber, a tackifier, a low viscosity, high volatility petroleum oil and a curing agent for cross-linking the halogenated butyl rubber. In another aspect, the composition of the present invention contains partially cross-linked brominated butyl rubber, a high melting point tackifying resin, a low viscosity, high volatility petroleum oil, and an isophorone diisocyanate curing agent, where the composition has a very high loading of the brominated butyl rubber and tackifier components.

In still another aspect, the present invention provides a method of forming a bond between overlapping sheets of roofing or waterproofing materials such as EPDM and butyl rubber membranes. The method comprises the steps of applying a thin film of a roofing cleaner/primer containing partially cross-linked halogenated butyl rubber, a tackifier, a low viscosity, high volatility petroleum oil and a curing agent for cross-linking the halogenated butyl rubber to the surface of a roofing or waterproofing sheet having a talc residue at the region of overlap. An adhesive material, either a liquid adhesive or a roofing tape, is then placed on the cleaned/primed surface of the roofing sheet and the sheets are overlapped. Pressure is applied to firmly bond the two sheets together. After the two sheets are joined, a caulking material may be used at the edge of the joint to provide additional protection against water. Thus, when applied to dust covered membranes the cleaner/primer effectively displaces the dust and leaves behind a primer film which is conducive to adhesive bonding by either splicing tape or solvent-based adhesives.

These and other objects and advantages of the invention will be more fully appreciated in connection with the following detailed description of the preferred embodiments of the invention.

DETAILED DESCRIPTION OF THE PREFERRED EMBODIMENTS

The cleaner/primer of the present invention is an oil-based, solvent free, low VOC liquid which provides a primed surface on a variety of substrates, including EPDM and butyl rubber-type roofing sheets. In its preferred embodiment the cleaner/primer contains partially cross-linked halogenated butyl rubber, a tackifier, a low viscosity, high volatility petroleum oil and a curing agent for cross-linking the halogenated butyl rubber.

The halogenated butyl rubber component provides a binder for the resin and is most preferably brominated isoprene-isobutylene copolymer, although other halogenated isoprene-isobutylene copolymers may be suitable or desirable in a particular application such as chlorinated butyl rubber. One particularly preferred brominated butyl rubber for use herein is sold under the trade name "Bromobutyl X-2" by Miles, Inc. As will be appreciated by those skilled in the art, the isoprene units comprise about 3% of the bromobutyl polymer. The bromobutyl polymer contains about 2% bromine by weight, with all of the bromine atoms being attached to the isoprene units. Most preferred for use herein is a pre-cross-linked butyl rubber master containing from about 93% to about 96% by weight brominated isoprene-isobutylene copolymer, from about 1% to about 2% zinc oxide, from about 1% to about 5% phenolic curing resin and from about 0.1% to about 1% magnesium oxide. It is preferred that the brominated isoprene-isobutylene copolymer have a Mooney viscosity (ML1+8 at 125 Degrees Celsius) of from about 41 to about 51.

Halogenated isoprene isobutylene-copolymer comprises from about 3% to about 8% by weight of the cleaner/primer composition of the present invention and more preferably from about 5% to about 7.5% by weight of the composition.

The cleaner/primer of the present invention further includes a tackifying agent. The tackifier acts as a reinforcing agent and provides heat resistance, viscosity control and tack to the cleaner/primer. The preferred tackifier is a thermoplastic hydrocarbon resin having a Ring and Ball melting point temperature (Tm) of between about 135° C. to about 185° C. and more preferably from about 175° C. to about 180° C. The most preferred tackifier for use in the present invention is a low molecular weight (from about 900 Mn to about 1100 Mn) thermoplastic resin having an acid number less than 1, a density (at 25 degrees C.) of from about 1.0 to about 1.1 kg/l, a melt viscosity (100 poises) of between about 208° C. and about 216° C. and a Tg (softening point) of above about 160° C. One suitable tackifier is sold under the trade name Piccovar AB180 by Hercules Inc.

Tackifier comprises from about 10% to about 25% by weight and more preferably from about 20% to about 22% by weight of the cleaner primer composition of the present invention.

The carrier component of the present invention comprises a petroleum oil. Preferably the oil carrier is a low viscosity, high volatility petroleum oil having a viscosity (SSU at 100 degrees F., ASTM test method D2161) of less than 40 and preferably from about 31 to about 36; a specific gravity (ASTM D1298) of about 0.78 to 0.85; a flash point (ASTM D92 C.O.C.) of from about 84 to 110; a distillation range (ASTM), with initial boiling point, 190°–210° degrees C., 50%, 220°–230° degrees C., and dry point, 240°–322° degrees C. The preferred oil has a volatile content (ASTM D2369) of 20–35%. Preferred petroleum oils for use in the present invention are SUNPAR LW 003 sold by Sun Company, Inc., and TELURA 401 sold by Exxon Company, U.S.A.

Petroleum oil comprises from about 60% to about 80%, and more preferably from about 70% to about 75% by weight of the cleaner/primer of the present invention.

The present invention further includes a curing agent for cross-linking the halogenated butyl rubber component. A number of curing agents are suitable for this purpose. Preferred curing systems are polyfunctional isocyanates including hexamethylene diisocyanate, polymethylene polyphenyl isocyanate, isophorone diisocyanate, and diphenyl methane diisocyanate among others. Particularly suited for use in the present invention are polyfunctional aliphatic polyisocyanates based on isophorone diisocyanate dissolved in Aromatic 100 solvent. The most preferred curing agent is sold under the trade name DESMODUR Z-4370/Z by MILES, INC. Additional components may be added to the curing system such as accelerators and inhibitors.

Curing agent comprises from about 2% to about 4%, and more preferably from about 2.5% to about 3.5% by weight of the cleaner/primer composition of the present invention.

Other components may also be present in the cleaner/primer composition of the present invention such as heat and UV stabilizers and the like.

The following table sets forth the preferred formulations for the present invention:

|  | Preferred % by WT. | Most preferred % by WT. |
|---|---|---|
| Brominated Butyl Rubber: | 3–8 | 5 |
| High MP Tackifier Resin: | 10–25 | 22 |
| Low Visc. High Vol. Oil: | 60–80 | 70 |
| Curing Agent: | 2–5 | 3.7 |

(cleaner/primer VOC less than about 250 grams per liter)

The compositions of the present invention are prepared by adding the dry components (bromobutyl rubber and tackifier, in crushed solid form) to the liquid components (oil and curing agent) The mixture is then stirred until the dry components are uniformly dispersed.

In the method of the present invention, the cleaner/primer composition is applied to the surface of a material such as a talc covered surface of an EPDM roofing sheet with a cloth rag or an abrasive cleaning pad. A thin film, between about 1 and about 3 mils, is applied to the surface. It will be understood by those skilled in the art that the cleaner/primer composition of the present invention dries more slowly than conventional high VOC cleaners. As a result the present invention has a greater coverage rate, particularly in high temperature environments, than conventional compositions. Use of an abrasive applicator is not necessary but has been found to loosen surface dust and deliver an even coat of the material. The cleaner/primer wets out the surface of the membrane and is readily absorbed into the membrane surface. After the cleaner/primer composition has dried it remains partially tacky. The roofing adhesive is then applied and a second roofing sheet is overlapped in the conventional manner to form a lap-joint. Pressure through the use of a roller or the like may be applied to increase the contact between the materials. The resultant bond has high bond strength and is resistant to degradation by environmental forces such as thermal fluctuations and the like. It has also been found that the cleaner/primer of the present invention is useful in priming metal surfaces to form metal/rubber laminates.

Thus it is apparent that there has been provided in accordance with the invention a method and composition that fully satisfies the objects, aims and advantages set forth above. While the invention has been described in connection with specific embodiments thereof it is evident that many alternatives, modifications and variations will be apparent to those skilled in the art in light of the foregoing description. Accordingly, it is intended to embrace all such alternatives, modifications and variations that fall within the spirit and broad scope of the appended claims.

EXAMPLES

The following examples are intended to further illustrate the invention and are not intended to limit the full scope of the patent claims.

Example 1

Primer of the Invention Versus Solvent Based Splice Cleaner

A. Primer of the invention

B. Commercially available splice cleaner/primer

Subject primers were used to clean and prime dusted EPDM membrane which was subsequently bonded by use of commercially available pressure-sensitive butyl splice tape.

| A | phr |
|---|---|
| Crosslinked rubber stock | 105.8 |
| Piccovar AB-180 resin | 500 |
| Desmodur Z4370/2 | 66 |
| Sun LW003 oil | 1560 |
| Total | 2231.8 |

VOC = 240 grams/liter (as measured by ASTM Method D2369)

Test Results

| Aging Period | Test Temperature | 180° Peel-A (Primer of the invention) | 180° Peel-B (solvent based primer) |
|---|---|---|---|
| 1 day @ RT | RT | 4.0 | 3.3 |
| | 70° C. | 0.6 | 0.3 |
| 7 days @ RT | RT | 4.3 | 4.0 |
| | 70° C. | 0.6 | 0.4 |
| 7 days @ RT + 14 @ 70° C. | RT | 4.6 | 6.0 |
| | 70° C. | 1.3 | 1.5 |
| 30 days @ RT | RT | 4.5 | 4.7 |
| | 70° C. | 1.0 | 0.6 |
| 30 days @ 70° C. | RT | 3.6 | 5.0 |
| | 70° C. | 1.1 | 1.5 |

This example shows that the low VOC primer's performance is comparable to that of a commercially available solvent based product both at room temperature and under elevated temperature conditions.

Example 2

Use of Various Oils in Low VOC Primer

| Formulas, phr | A | B | C | D |
|---|---|---|---|---|
| Partially crosslinked rubber stock | 105.8 | 105.8 | 105.8 | 105.8 |
| Piccovar AB-180 resin | 500 | 500 | 500 | 500 |
| Desmodur Z4370/2 | 66 | 66 | 66 | 66 |
| Sun LW003 | 1560 | | | |
| Telura 401 | | 1560 | | |
| Calsol 804 | | | 1560 | |
| Witsol 420 | | | | 1560 |
| Total | 2231.8 | 2231.8 | 2231.8 | 2231.8 |

A. Peel adhesion of commercially available pressure-sensitive butyl tape to dusted EPDM roofing membrane cleaned and primed with primers of this example.

| Aging Period | Test Temp | A | B | C | D | Solvent based cleaner/primer |
|---|---|---|---|---|---|---|
| 7 days @ RT | RT | 7.6 | 5.6 | 5.4 | 4.9 | 4.0 |
| | 70° C. | 2.1 | 1.2 | 1.1 | 1.5 | 0.4 |
| 7 @ RT + 14 days @ 70° C. | RT | 6.9 | 5.6 | 5.9 | 4.9 | 6.6 |
| | 70° C. | 2.1 | 2.0 | 2.2 | 2.1 | 1.5 |

B. Peel adhesion of commercially available butyl contact adhesive to dusted EPDM roofing membrane cleaned and primed with primers of this example.

| Aging Period | Test Temp | A | B | C | D | Solvent based cleaner/primer |
|---|---|---|---|---|---|---|
| 7 days @ RT | RT | 4.0 | 4.4 | 5.9 | 4.4 | 6.8 |
| | 70° C. | 0.5 | 0.5 | 0.6 | 0.6 | 0.6 |
| 7 @ RT + 14 days @ 70° C. | RT | 4.3 | 4.8 | 5.9 | 4.1 | 6.9 |
| | 70° C. | 2.2 | 2.0 | 2.3 | 1.8 | 3.0 |

The oils used in this comparison display a variety of boiling ranges and volatility characteristics but still provide equivalent performance with either pressure-sensitive tape or solvent based adhesive when compared either to each other or to a solvent based cleaner primer (Carlisle Sure-Seal Splice Cleaner) control.

Example 3

Use on Metal

A. Formula A of example 2 used to clean and prime galvanized metal

| Aging Period | Test Temp | Adhesive | A | Solvent based cleaner/primer |
|---|---|---|---|---|
| 1 day @ RT | RT | Butyl P.S. Tape | 7.6 pli | 3.3 pli |
| | 70° C. | | 1.4 | 0.4 |
| 7 days @ RT | RT | Butyl P.S. Tape | 6.7 | 3.3 |
| | 70° C. | | 1.6 | 0.4 |
| 7 @ RT + 14 days @ 70° C. | RT | Butyl P.S. Tape | 6.1 | 3.3 |
| | 70° C. | | 1.2 | 0.8 |
| 7 @ RT + 30 days @ 70° C. | RT | Butyl P.S. Tape | 5.0 | 2.8 |
| | 70° C. | | 0.8 | 0.6 |

The primer of the invention provides clearly superior adhesion to metal when compared to the commercially available solvent based primer. The superiority of the invention is particularly apparent after 1 and 7 days aging at room temperature, the most important time frame in terms of field installation of the splice tape system.

Example 4

Variations of Resin with Different Softening Points and Chemical Compositions

| Formulas | A | B | C | D |
|---|---|---|---|---|
| Partially crosslinked rubber stock | 105.8 | 105.8 | 105.8 | 105.8 |
| Piccovar AB-180 resin | 500 | | | |
| Desmodur Z4370/2 | 66 | 66 | 66 | 66 |
| Sun LW003 | 1560 | 1560 | 1560 | 1560 |
| LX1035 | | 500 | | |
| Arkon P140 | | | 500 | |
| Petrorez PR140 | | | | 500 |
| Dabco T-12 | 2 | 2 | 2 | 2 |
| Total | 2231.8 | 2231.8 | 2231.8 | 2231.8 |

Test Data

I. Peel strength of commercially available pressure-sensitive butyl splicing tape used to bond dusted, non-reinforced EPDM roofing membrane primed with the primers of the example.

| | | Peel Strength, pli | | | |
|---|---|---|---|---|---|
| Aging Period | Test Temp | A | B | C | D |
| 7 days @ RT | RT | 5.1 | 5.4 | 3.0 | 4.1 |
| | 70° C. | 0.8 | 2.0 | 0.3 | 2.0 |
| 7 @ RT + 14 | RT | 7.4 | 5.4 | 6.0 | 5.8 |
| days @ 70° C. | 70° C. | 2.1 | 2.0 | 2.3 | 1.9 |

II. Peel strength of commercially available solvent based Butyl contact cement used to bond dusted, non-reinforced EPDM roofing membrane primed with the primers of the example.

| Aging Period | Test Temp | A | B | C | D |
|---|---|---|---|---|---|
| 7 days @ RT | RT | 3.1 | 3.9 | 5.3 | 5.1 |
| | 70° C. | 0.8 | 0.8 | 0.9 | 0.9 |
| 7 @ RT + 14 | RT | 4.3 | 6.4 | 5.7 | 5.5 |
| days @ 70° C. | 70° C. | 1.2 | 2.2 | 1.7 | 2.1 |

This example illustrates the variety of tackifying resins which can be used to yield acceptable adhesion properties in this invention

What is claimed is:

1. A liquid cleaner/primer composition, comprising:
   from about 3 to about 8 percent by weight halogenated butyl rubber;
   from about 10 to about 25 Percent by weight tackifier resin;
   from about 60 to about 80 percent by weight low viscosity petroleum oil; said petroleum oil having a viscosity of less than about 40, SSU at 100° F.; and
   a curing agent, wherein the VOC content of said composition is less than about 250 grams per liter.

2. The composition recited in claim 1, wherein said halogenated butyl rubber is partially cross-linked.

3. The composition recited in claim 1, wherein said tackifier resin has a softening point above about 140° C.

4. The composition recited in claim 1, wherein said oil has a viscosity of from about 31 to about 36, SSU at 100 degrees F.

5. The composition recited in claim 1, wherein said oil has a volatile content of from about 20 to about 35%.

6. The composition recited in claim 1, wherein said halogenated butyl rubber is brominated isoprene-isobutylene copolymer.

7. The composition recited in claim 1, wherein said tackifier resin is a thermoplastic polymer.

8. The composition recited in claim 1, wherein said curing agent is a polyfunctional aliphatic polyisocyanate.

9. The composition recited in claim 1, wherein said cleaner/primer composition is solvent-free.

10. A method of cleaning and priming surfaces to be bonded, comprising the steps of:
   providing a liquid cleaner/primer composition containing from about 3 to about 8 percent by weight brominated isoprene-isobutylene copolymer, from about 10 to 25 percent by weight thermoplastic resin tackifier, from about 60 to about 80 percent by weight petroleum oil, said petroleum oil having a viscosity of less than about 40 SSU at 100° F., and a curing agent for cross-linking said brominated isoprene-isobutylene copolymer;
   applying a thin film of said cleaner/primer to a first surface to prime said first surface;
   applying an adhesive to said primed first surface; and
   adhering a second surface to said first surface at the site of said adhesive;
   wherein, said first surface is a waterproof sheet material and said second surface is a waterproof sheet material.

11. The method of cleaning and priming surfaces recited in claim 10 wherein said applied thin film has a thickness of from about 1 to about 3 mils.

12. A method of cleaning and priming surfaces to be bonded, comprising the steps of:
   providing a liquid cleaner/primer composition containing from about 3 to about 8 percent by weight brominated isoprene-isobutylene copolymer, from about 10 to 25 percent by weight thermoplastic resin tackifier, from about 60 to about 80 percent by weight petroleum oil, said petroleum oil having a viscosity of less than about 40 SSU at 100° F., and a curing agent for cross-linking said brominated isoprene-isobutylene copolymer;
   applying a thin film of said cleaner/primer to a first surface to prime said first surface;
   applying an adhesive to said primed first surface; and
   adhering a second surface to said first surface at the site of said adhesive;
   wherein, said first surface is a metal material and said second surface is a rubber material.

* * * * *